3,341,787
LASER SYSTEM WITH PUMPING BY SEMI-CONDUCTOR RADIANT DIODE
James R. Biard, Richardson, and Charles S. Williams, Dallas, Tex., assignors to Texas Instruments Incorporated, Dallas, Tex., a corporation of Delaware
Filed Dec. 3, 1962, Ser. No. 241,743
1 Claim. (Cl. 331—94.5)

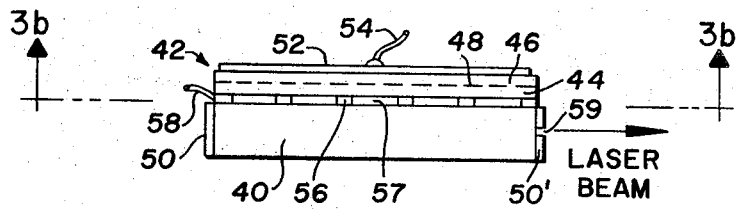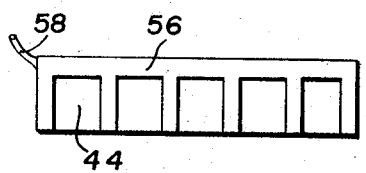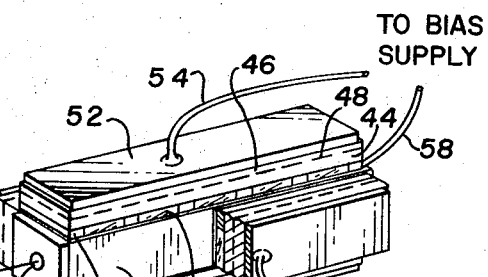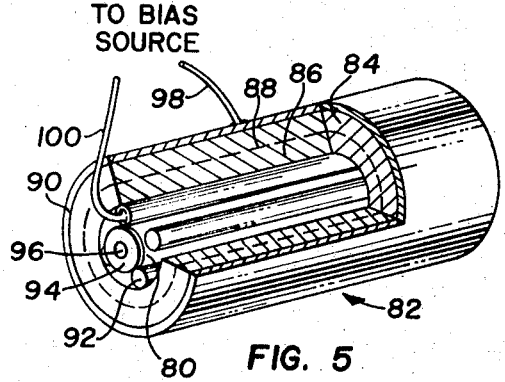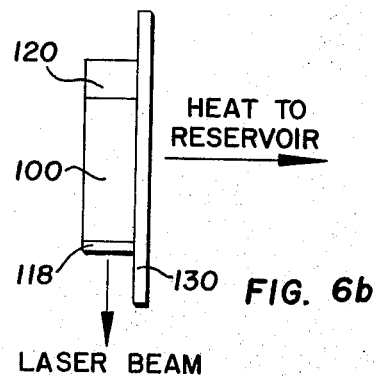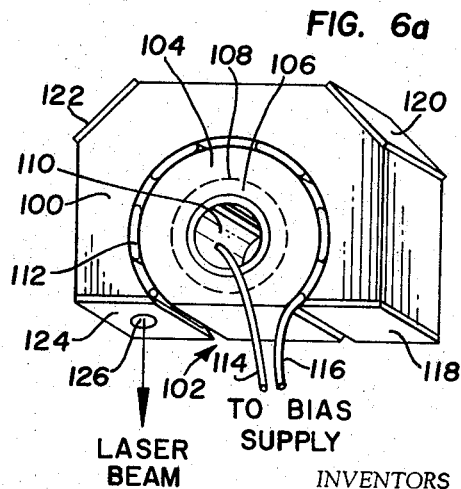
INVENTORS
James R. Biard
Charles S. Williams United States Patent Office 3,341,787
Patented Sept. 12, 1967

The present invention relates to lasers. More specifically it relates to a laser system comprised essentially of a pumping source and a laser body wherein the band of wavelengths generated by the pumping source substantially matches the preferred band of wavelengths for stimulating laser emission in the laser body.

A "laser" is a particular light emitting device and the name is an acronym denoting light amplification by stimulated emission of radiation. The utility, operation and general description of such a device is described in Schawlow, A. L., and Townes, C. H., Phys. Rev., 112, No. 6 p. 1940, (1958). Briefly, a laser body, such as described above can be caused to emit a large concentration of light energy in a coherent package, or more aptly, a large concentration of light energy traveling in substantially a plane wave with a minimum of spreading, when the body is supplied or "pumped" with a minimum amount of electro-magnetic energy of a particular band of wavelengths. Normally, the laser body has the shape of an elongated rod of circular, rectangular or square cross-section, and has parallel reflecting surfaces on the ends thereof for reflecting back and forth the stimulated light. A small transmitting aperture in one of the reflecting surfaces, such as a partially transmitting portion, is provided for transmitting the stimulated light out of the laser rod.

The laser emission is stimulated by supplying electromagnetic energy of a particular band of wavelengths and in sufficient amount to excite the atoms above a certain threshold energy. The means by which this is accomplished can be generally designated as a pump, wherein the conventional pump comprises a high energy continuous spectrum light source and a suitable optical system for condensing the light to a small focus. The optical system ensures that a maximum percentage of the light from the continuous source is supplied internally to the laser body, usually through the sides thereof. However, since there is a preferred narrow band of wavelengths capable of stimulating the laser action, the great percentage of the total light energy emitted from the continuous source is wasted.

The present invention provides a laser system wherein the band of wavelengths of the electromagnetic energy supplied by the pump substantially corresponds to the preferred band of wavelengths for stimulating laser action in the laser body, thus increasing the overall efficiency of the laser system. In the preferred embodiment the pump is comparable in size to the laser body and is situated adjacent thereto, so that the light emitted by the pump is directed to enter the laser body, thus obviating the necessity of a conventional optical system between the pump and the laser.

Therefore, a primary object of the present invention is to provide a new and improved laser system.

Another object is to provide a laser system comprised essentially of a laser body and a pumping source wherein the band of wavelengths generated by the pumping source are substantially matched to the band of wavelengths required for stimulating laser action in the laser body.

A further object is to provide a laser system that does not require the use of a conventional optical system for condensing the pumping light between the pump and the laser body.

Still another object is to provide a laser system of very small total volume and which has a very high overall operating efficiency.

Other objects, features and advantages will become apparent from the following detailed description when taken in conjunction with the appended claims and the attached drawing wherein like reference numerals refer to like parts throughout the several figures, and in which:

FIG. 3a is a side elevational view of one embodiment of an integrated laser system according to the invention;

FIG. 3b is a sectional view taken along line X—X of FIG. 3a;

FIG. 4 is a view partly in section of another embodiment of the invention;

FIG. 5 is a view partly in section of yet another embodiment;

FIG. 6a shows a further embodiment of the invention; and

FIG. 6b is a side view of the embodiment shown in FIG. 6a.

According to the invention, a laser material of the desired geometrical configuration is optically coupled to a semiconductor recombination diode used as a radiant source to provide a laser system having the characteristics and advantages alluded to above. In the preferred form of the invention, the radiant diode and the laser body are integrated to provide a minimum volume laser system and to obviate the necessity of a conventional optical system for focusing the energy generated by the diode on the laser body. Although radiant diodes constituted of different semiconductor materials are used with different laser materials, as will be described below, an illustrative description of the theory and operation of such a diode is given in the copending application of James R. Biard, et al., entitled, Semiconductor Device, filed Aug. 8, 1962, Ser. No. 215,642, and assigned to the common assignee, which is directed specifically to the theory, operation, and construction of a gallium-arsenide radiant diode. This diode and those constituted of other semiconductor materials and referred to hereinafter emit electromagnetic energy of a particular band of wavelengths when the junction is forward biased to cause recombination of majority and minority carriers on either side of the junction. This effect is very efficient in terms of the total amount of electromagnetic energy emitted by the diode as compared to the total amount of biasing current passed through the junction. By a proper choice of the materials constituting the radiant diode and the laser body, the bandwidth of the energy emitted by the diode coincides with or overlaps the bandwidth of radiation necessary for stimulating laser action in the laser body. Thus there is provided a laser system having an energy pump whose output is "matched" to the input of the laser body, such that a high overall efficiency of the total laser system is achieved. It is then apparent that very little of the pumping light is wasted.

The radiant diode is integrated with the laser body in the preferred form of the invention to provide overall compact size, and the two members are optically coupled to obviate the necessity of a conventional optical system for condensing the pumping light to a small focus. Here, the radiant diode and laser body are comparable in size and the entire emitting surface of the diode is utilized for pumping. That is to say, the entire emitting surface of the diode is adjacent to a surface of the laser body. The reduced size of the radiant diode pumping source is possible because of its overall increased pumping efficiency.

Figure 1A:
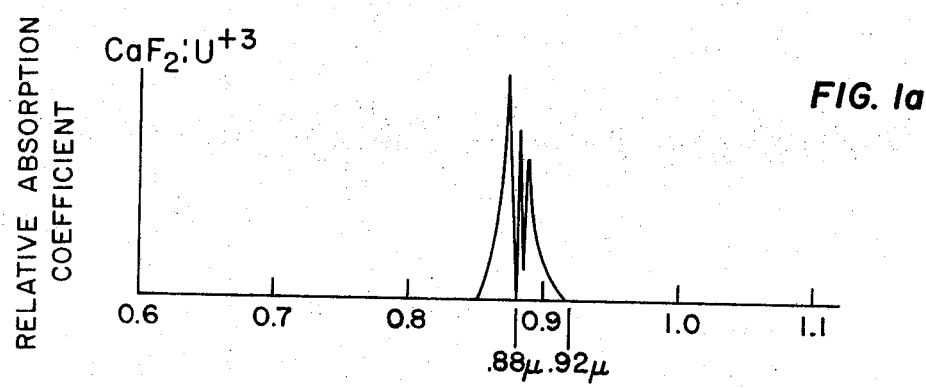
FIG. 1a shows the preferred absorption band of electromagnetic energy useful for stimulating laser action in a calcium-fluoride body doped with uranium.
Figure 1B:
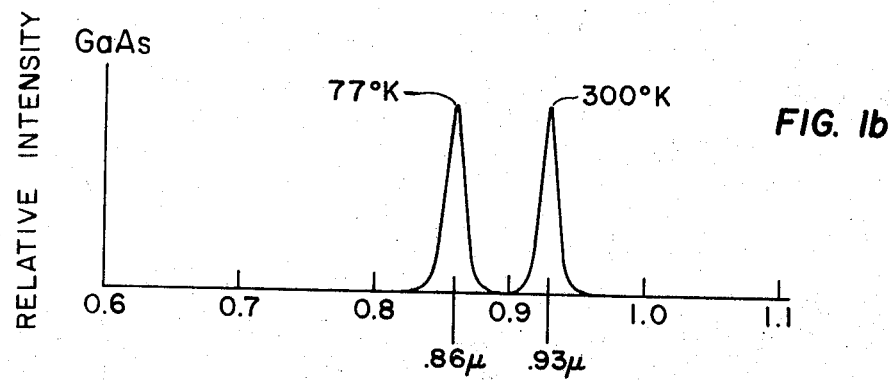
FIG. 1b shows the wavelengths of electromagnetic energy generated by a gallium-arsenide radiant diode at two distinct operating temperatures.

Referring now to FIG. 1a there is shown the band of wavelengths useful for stimulating laser action in a single crystal of calcium-fluoride ($CaF_2$) doped with uranium. A description of the laser phenomenon and the characteristics of this particular laser material are given in the publication of Boyd, G. D., et al., Excitation, Relaxation and Continuous Maser Action in the 2.613–Micron Transistron of $CaF_2:U^{+3}$, Phys. Rev. Letters, vol. 8, No. 7, Apr. 1, 1962, Sec. 1, p. 269. It will be noted that there is a bandwidth from 0.88 micron to 0.92 micron that is useful for stimulating the laser action. Thus if a certain minimum quantity of electromagnetic energy within this particular band of wavelengths is supplied to the atoms of this material, laser action will be stimulated. The minimum amount required is given in the Schawlow and Townes publications, supra. In FIG. 1b there is shown the band of wavelengths of the electromagnetic energy of highest intensity emitted by a gallium-arsenide radiant diode at two different operating temperatures, viz. 77° K. and 300° K. The former has a peak energy at about 0.86 micron and the latter at about 0.93 micron. The peak occurs at wavelengths intermediate these two at intermediate temperatures. By "optically" coupling the laser body and the radiant diode, as hereinafter described, the two cooperate as a complete laser system when the diode is forward biased with an electrical current source, wherein the term optical coupling is used to refer to coupling of the electromagnetic energy generated by the diode to the laser body.

Figure 2A:
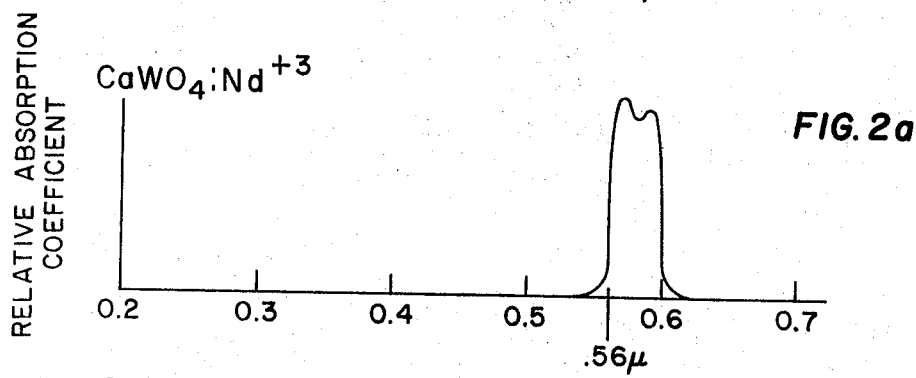
FIG. 2a shows the preferred absorption band of electromagnetic energy useful for stimulating laser action in another laser material, calcium-tungstate doped with neodymium.
Figure 2B:
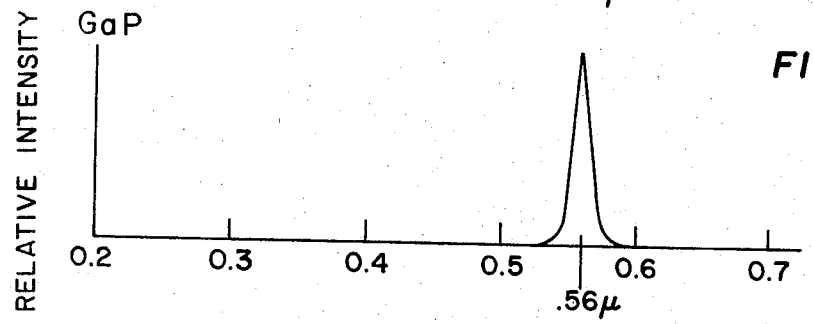
FIG. 2b shows the wavelengths of electromagnetic energy generated by a gallium-phosphide radiant diode.

The combination of the two materials above described is for purposes of example only and should not be construed as limiting the invention. By way of another example providing a useful combination, reference is had to FIGS. 2a and 2b, which are, respectively, the useful absorption bandwidth for the laser material calcium-tungstate ($CaWO_4$) doped with neodymium, and the band of wavelengths for the most intense emission for a radiant diode constituted of gallium-phosphide (GaP). The laser properties of $CaWO_4$ are described in Johnson, L. F., et al., Continuous Operation of the $CaWO_4:Nd^{+3}$ Optical Maser, Proc. IRE 50, 213 (1962), and the GaP diode is described in the publication of Ullman, F. G., Carrier Injection Electroluminescence in GaP, J. Electr. Chem. Soc., 109, 805 (1962). It will be seen that the absorption bandwidth of the laser material overlaps the bandwidth of the electromagnetic energy emitted by the diode, thus providing another useful combination for a complete laser system. Again, this combination of materials is given as an illustrative example only.

Referring now to FIG. 3a there is shown one embodiment of the invention which includes an elongated laser rod 40 having a rectangular cross-section, and a radiant diode generally designated at 42 adjacent one surface of the rod, this being a lateral surface. The laser and diode are integrated into a single unit along the length of the rod as shown, so that light emitted by the diode will be directed into the rod along its length. The diode and laser materials can be constituted of any suitable materials, such as described in either FIGS. 1a and 1b or FIGS. 2a and 2b, such that the band of wavelengths emitted by the diode coincide or overlap with the band of wavelengths primarily useful for stimulating laser action in the rod.

The diode consists of a body of semiconductor material, as described above, with a rectifying junction 48 formed in one surface thereof. Assuming for purposes of example that the diode is comprised of gallium-arsenide as described in the Biard application, supra, the region 44 adjacent the rod is N-type conductivity and the region 46 is P-type conductivity that is formed, for example, by diffusion of a P-type impurity into the body such as zinc, wherein the optimum impurity concentrations are given in that application. A non-rectifying electrical contact 52 such as, for example, an alloy of 96% gold and 4% zinc, is provided over the entire major surface of the P-type region and preferably constitutes a good reflecting surface for any light generated within the diode, thus causing as much light as possible to be directed toward the laser. The contact can be made by any suitable method, such as evaporation and alloying. Electrical contacts such as, for example, pure tin, are also provided to the major surface of the N-type region, as more clearly illustrated in the plan view of the major surface of the N-type region of FIG. 3b, which is a view taken along line 3b—3b of FIG. 3a. This contact covers only a portion of the surface so that light is permitted to pass through the surface without substantial obstruction. However, the total area and spacing of the contact is such as to preclude any substantial debiasing of the junction 48 when the forward bias current is applied. A suitable light transmitting cement, such as Canada balsam, can be used to join the diode with the laser as indicated at 57. Electrical leads 54 and 58 are attached to the contacts 52 and 56, respectively, for connection to a current bias source (not shown).

The Canada balsam cement noted above has an index of refraction intermediate the diode and the laser. Thus the same amount of light will enter the laser bulk from the diode as would be the case if the diode abutted the laser. However, if a cement is used the index of refraction of which is outside the range defined by the laser and diode materials, less light will be transmitted from the diode to the laser body than if the two were abutting, due to an increased amount of internal reflection. It is therefore desirable that the index of refraction of the cement used, if any, have an index of refraction intermediate that of the diode and the laser. In addition, the cement must obviously be transmissive of the electromagnetic energy generated by the diode. Although not absolutely necessary, it is desirable that the cement or the walls of the laser body be absorptive or transmissive of the laser light wavelength to reduce or eliminate all modes other than those associated with the laser beam proper. If the laser light not directed along the laser beam proper is reflected internally within the laser body between the side walls thereof, it is possible that other modes will be set up in addition to the desired modes associated with the laser beam proper, and this condition tends to reduce the intensity of or destroy the laser beam proper. Removing this undesired light from the bulk of the laser body results in only the desired modes being generated.

A reflecting surface or mirror is provided over the surface of each end of the laser so indicated at 50 and 50'. For example, each end can be silvered for this purpose, and the inner reflecting surfaces of the two are exactly parallel to each other. As the laser is stimulated to emission by the pumping light, the emitted light reflects back and forth between the end surfaces and accumulates as a very substantial amount of light energy. A small aperture or small transmitting area 59 is provided in one of the reflecting end surfaces 50' for allowing the emitted light to escape from the laser in a substantially plane wave of concentrated energy, as indicated by the arrow in FIG. 3a. Any other suitable means known in the laser art can be used to extract the emitted light from the laser.

Referring now to FIG. 4 there is shown a laser rod 40 of rectangular cross-section with a radiant diode adjacent each of the major surfaces, with one of the diodes shown partly in section for purposes of clarity. This configuration operates the same as that described in FIGS. 3a and 3b, except that a pumping source supplies optical energy to the laser at all surfaces rather than a single side thereof. The contacts 52 to the P-type regions of the diodes are all interconnected, as are the contacts 56 to the N-type regions, and a current bias source is applied to the parallel arrangements of the diodes. Alternately, each of the diodes can be connected to a separate bias source.

In each of FIGS. 3a, 3b and 4, the cross-section of the laser rod is shown as rectangular (or square) preferably for reasons of fabrication. However, any other geometrical cross-section is adequate, such as a triangle, etc. There is shown in FIG. 5 a preferred geometrical configuration that is most efficient volume and spacewise. Here, a laser rod 80 of circular cross-section is surrounded by a cylindrical radiant diode designated generally at 82. A reflecting surface is provided on each end of the rod as before, as shown on the one end and designated at 94 with an aperture 96, the other end of the rod not being exposed to view. The diode comprises a semiconductor body having a region 86 of one conductivity type (preferably N-type in the case of gallium-arsenide) and a second region 84 of opposite conductivity type separated from the region 86 by a rectifying junction 88. A reflecting, non-rectifying electrical contact 90 is provided over the outer cylindrical surface of the diode, and spaced electrical contacts 92 are provided to the inner cylindrical surface. Electrical leads 98 and 100 are connected to the contacts 90 and 92, respectively, for connection to a current bias source to supply current through the diode junction.

The cylindrical diode can be fabricated, for example, by growing a single crystal from a melt of the desired semiconductor material doped with an N-type impurity and machining the crystal to the desired shape, including the drilling of a hole for the laser rod. The crystal is then subjected, for example, to diffusion from the vapor state of a suitable P-type impurity to form the P-type region 84 and junction 88. The general process of making semiconductor diodes of this nature are well known in the art and will not be described in detail. The electrical contacts 92 to the inner surface are preferably wires of a suitable metal or alloy running the length of the cylinder and alloyed to the inner surface thereof to form therewith a non-rectifying contact. The outer contact 90 is preferably evaporated onto the diode surface and alloyed therewith. The laser rod is then inserted in the interior of the diode, and secured by means such as the light transmitting Canada balsam cement mentioned previously.

A further embodiment of the invention is shown in FIGS. 6a and 6b and is most efficiently utilized as a laser system adapted to be cooled below room temperature for more efficient operation. A laser body 100 is formed generally in a U-shape with a circular portion cut out of the interior as shown. The areal dimensions of the laser body (shown in the plane of the drawing) are generally larger than the thickness dimension. A radiant diode 102 as described above is fabricated to a shape generally resembling a donut and has an outer diameter slightly less than the diameter of the circular opening in the laser body. The diode comprises a single crystal of semiconductor material having one region 104 of one conductivity type separated by a rectifying junction 108 from a second region 106 of the opposite conductivity type. A non-rectifying contact 110 is provided over the entire inner surface of the region 106, and spaced non-rectifying contacts 112, such as wires as described with reference to FIG. 5, are provided to the outer surface of the region 104. The wire contact in this figure is shown to be a single continuous wire comprised of a plurality of spaced lengths thereof contacting the surface of the region 104. The diode including the contacts 112 fits snugly in the opening in the laser body, and is secured therein by any suitable light transmitting cement, if desired, such as Canada balsam as previously mentioned. Electrical leads 114 and 116 are provided for connecting the two regions 106 and 104, respectively, to a current bias source (not shown).

The laser body defines generally a U-shape path for the laser emission, and is essentially equivalent to any other laser rod in which the stimulated light is caused to be reflected at 90° at two intermediate locations between the ends of the rod. One end of the rod is provided with a reflecting surface 118 and the other end is provided with a reflecting surface 124 with an aperture 126 for allowing a portion of the stimulated light to emerge from the rod. Intermediate the ends, there is provided one beveled surface having a reflecting surface 120 at an angle of 45° with the surface 118, and a second beveled surface having a reflecting surface 122 at 90° to the first beveled surface and at 45° to the end reflecting surface 124. All of the faces are so oriented to cause light generated by laser stimulation within the body to follow a path along or parallel to a line connecting the reflecting surfaces.

There is shown in FIG. 6b a side elevational view of the laser system, and attached to one face thereof is a heat exchanger plate 130, the other side of the plate of which can be put in contact with a cold reservoir. For example, if the laser body is constituted of calcium-fluoride and the diode is gallium-arsenide, it is desirable to operate the laser system at a temperature intermediate 77° K. and 300° K. as shown in FIGS. 1a and 1b, since an intermediate temperature will more perfectly match the wavelength band of the electromagnetic energy generated by the diode with the preferred absorption band of the laser. Thus a reservoir such as a mass of Dry Ice in thermal contact with the plate 130 can be used to maintain the laser system below room temperature. The relatively large surface area of the laser system contacting the plate 130 provides for an efficient transfer of heat to the reservoir. To further increase the heat flow, a solid metallic core can be snugly fit inside the hole in the diode, with one end in thermal contact with the plate 130. Here, the core can also serve as an electrical connection to the diode contact 110.

To illustrate the electrical current densities required for the laser system of this invention, reference will be had to a laser body comprised of calcium-fluoride doped with uranium, and in which the pumping diode is comprised of gallium-arsenide. However, similar considerations are equally applicable to other combinations of materials, although the absolute magnitudes of the parameters will be different. The following conditions and parameters will be assumed for a laser rod whose length is 1 cm. and which has a square cross-sectional area of 2 mm. by 2 mm.:

Number of excited atoms per second required to stimulate a calcium-fluoride laser of the above volume (.04 cm.$^2$) to a threshold condition, at which it undergoes laser emission=$5.82 \times 10^{14}$ atoms/sec.=$N_o$.

Efficiency of a gallium-arsenide diode, defined as the number of photons of electromagnetic energy of the preferred band of wavelengths generated per electron of bias current flowing across the diode junction=5%=Eff.$_{diode}$.

Index of refraction of laser=1.43=$n_{laser}$.

Index of refraction of diode=3.3=$n_{diode}$.

Critical angle between diode and laser interface, defined as the maximum angle with the normal to the interface that light can pass from the diode into the laser =25.4°=$\alpha_c$.

Average probability of a photon of light generated at any point within the diode striking the diode-laser interface at an angle equal to or less than the critical angle $\alpha_c$, and being transmitted from the diode into the laser =0.5=$P$.

Laser efficiency defined as the number of atoms excited per photon entering the laser from the diode=0.1 =Eff.$_{laser}$.

Then, the number of electrons per second N of forward bias current through the junction of the diode required to stimulate laser action is $$N = \frac{N_o}{\text{Eff.}_{\text{diode}} \times \text{PX Eff.}_{\text{laser}}}$$

and for the parameters given, $$N = 2.3 \times 10^{19} \text{ electrons/sec.}$$

Since the electronic charge is $1.6 \times 10^{19}$ coulombs, the minimum required current in amperes through the diode is $$i = 3.68 \text{ amperes.}$$

If each of the four sides of the laser rod has adjacent it a diode whose junction area is equal to the area of the side, namely 20 mm.², as shown in FIG. 4, the current density $D_i$ through the junction of each diode is then $$D_i = 4.60 \text{ amperes/cm.}^2$$

To a good approximation the amount of optical energy emitted by the laser is a linear function of the input current to the diode, above the threshold current.

The index refraction of the cement need not be considered in the above calculations, since the same amount of light will enter the laser as if the laser and diode were abutting, as noted previously. This condition exists because of the intermediate value of the index of refraction of the cement. In connection with the use of a cement, it is to be understood that it is not critical that it be used at all, but rather the diode and laser can form a direct interface. In fact the diode and laser can form a single integrated body, if desired, to effect the results above described.

Although the invention has been described with reference to specific examples, other modifications and substitutions that do not depart from the scope of the invention will become apparent to those skilled in the art, and the invention is to be limited only as defined in the appended claim.

What is claimed is:

A laser system comprising:
(a) a unitary laser body having a circular aperture therethrough forming a generally U-shaped resonant cavity producing a laser beam along a generally U-shaped path within said body and about said aperture when stimulated by electromagnetic energy having a wavelength within a discrete band of wavelengths, and
(b) a semiconductor diode in said aperture for generating electromagnetic energy having a band of wavelengths coinciding with at least a portion of said discrete band of wavelengths when the junction thereof is forward-biased with a current source,
(c) said junction defining a cylindrical surface coaxial with said circular aperture,
(d) said laser body being optically coupled to said diode for absorbing electromagnetic energy generated by said diode.

References Cited

UNITED STATES PATENTS

| | | | |
|---|---|---|---|
| 2,314,096 | 3/1943 | Laverenz | 331—94.5 |
| 2,841,860 | 7/1958 | Koury | 29—25.3 |
| 2,890,976 | 6/1959 | Lehovec | 14—171 |
| 3,102,201 | 8/1963 | Braunstein et al. | 88—61 |
| 3,102,920 | 9/1963 | Sirons | 331—94.5 |

FOREIGN PATENTS 608,711    3/1962    Belgium.

OTHER REFERENCES

Baugh et al.: "Cathodoluminescent Optical Maser Pumping," Journal of the Optical Society of America, vol. 52, No. 5, May 1962, p. 602.

Johnson et al.: "Continuous Operation of the CaWO$_4$: Nd$^{+3}$ Optical Maser," Proc. of the IRE, vol. 50, No. 2, February 1962, p. 213.

Masters: "Coupling of Laser Rods," Proc. of the IRE, vol. 50, No. 2, p. 221.

Boyd et al.: "Excitation Relaxation and Continuous Maser Action in the 2.613-Micron Transistion of CaF$_2$:U$^{+3}$, Physical Review Letters, vol. 8, No. 7, Apr. 1, 1962, pp. 269 to 272.

Vogel et al.: "Lasers: Devices and Systems—Part I," Electronics, vol. 34, No. 34, Oct. 27, 1961, p. 44.

Ready et al.: "Optical Pumping of Masers Using Laser Output," Proc. of the IRE, vol. 50, No. 3, March 1962, pp. 329 and 330.

Keyes et al.: "Recombination Radiation Emitted by Callium Arsenide," Proc. of the IRE, vol. 50, No. 8, August 1962, pp. 1822 and 1823.

Trion: Technical Bulletin T–1261–1, "Total Internal Reflecting Geometry Ruby Rods," Dec. 4, 1961.

JEWELL H. PEDERSEN, *Primary Examiner.*

J. L. CHASKIN, R. L. WIBERT, *Assistant Examiners.*